(12) United States Patent
Shinokura et al.

(10) Patent No.: US 7,652,659 B2
(45) Date of Patent: Jan. 26, 2010

(54) INFORMATION INPUT DEVICE AND METHOD

(75) Inventors: Kiichiro Shinokura, Tokyo (JP); Tosikazu Fukuda, 16-14, Shibashin-machi, Kawaguchi-shi, Saitama-ken, 333-0851 (JP)

(73) Assignees: Pioneer Corporation, Tokyo (JP); Tosikazu Fukuda, Saitama-ken (JP)

( * ) Notice: Subject to any disclaimer, the term of this patent is extended or adjusted under 35 U.S.C. 154(b) by 500 days.

(21) Appl. No.: 11/089,033

(22) Filed: Mar. 25, 2005

(65) Prior Publication Data

US 2005/0225529 A1   Oct. 13, 2005

(30) Foreign Application Priority Data

| Mar. 25, 2004 | (JP) | ............................. 2004-088416 |
| Mar. 10, 2005 | (JP) | ............................. 2005-066564 |

(51) Int. Cl.
  *G09G 5/00* (2006.01)
(52) U.S. Cl. ....................................................... 345/156
(58) Field of Classification Search ................. 345/184, 345/156–173
  See application file for complete search history.

(56) References Cited

U.S. PATENT DOCUMENTS

| 5,432,530 | A | * | 7/1995 | Arita et al. ................... 345/159 |
| 5,504,502 | A | * | 4/1996 | Arita et al. ................... 345/160 |
| 5,666,138 | A | * | 9/1997 | Culver ......................... 345/184 |
| 6,239,790 | B1 | | 5/2001 | Martinelli et al. |
| 6,256,011 | B1 | * | 7/2001 | Culver ......................... 345/157 |
| 6,300,938 | B1 | * | 10/2001 | Culver ......................... 345/184 |
| 6,417,838 | B1 | | 7/2002 | Inamura |
| 6,580,420 | B1 | * | 6/2003 | Wang .......................... 345/163 |
| 2001/0007449 | A1 | * | 7/2001 | Kobachi et al. ............. 345/156 |
| 2001/0043149 | A1 | | 11/2001 | Chan |
| 2003/0189552 | A1 | | 10/2003 | Chuang et al. |
| 2005/0000059 | A1 | * | 1/2005 | Sung et al. ..................... 16/320 |

FOREIGN PATENT DOCUMENTS

| EP | 0 854 413 A2 | 7/1998 |
| JP | 7-117875 | 12/1995 |
| JP | 10-207616 | 8/1998 |
| JP | 10-301706 | 11/1998 |
| WO | 95/22741 A1 | 8/1995 |
| WO | 01/35385 A1 | 5/2001 |
| WO | 01/82049 A1 | 11/2001 |

* cited by examiner

*Primary Examiner*—Amr Awad
*Assistant Examiner*—Waseem Moorad
(74) *Attorney, Agent, or Firm*—Arent Fox LLP (57) ABSTRACT

An information input device and an information input method are provided which can provide portability to thereby improve manipulation flexibility and has a high manipulation resolving power. The device includes two relatively slidable plate-shaped input members held between fingertips or parts of fingers of a hand to slide relative to each other, and an information producing portion for producing input information in accordance with at least a relative position or a relative movement of the plate-shaped input members.

20 Claims, 9 Drawing Sheets

FIG.1 A

PRIOR ART

FIG.1 B

PRIOR ART

FIG.2 A

PLAN VIEW

FIG.2 B

CROSS-SECTIONAL VIEW

INFORMATION INPUT DEVICE AND METHOD

BACKGROUND OF THE INVENTION

The present invention relates to an information input device and an information input method.

The present application claims each priority from Japanese Patent Application Nos. 2004-088416 and 2005-066564, each disclosure of which is incorporated herein by reference.

These days, AV (audiovisual) products, household electric appliances, industrial equipment, and computers have been expanded in their functionality. The expansion in functionality has required an increase in the amount of information to be provided thereto. This in turn has made information input devices sophisticated, thereby causing the users to feel awkward to use those devices. For example, a TV remote controller has many control buttons which make the user feel awkward to use it. Worse yet, its mode switching capability adds more functions to these buttons, which makes the user further confused in using it.

On the other hand, there are also GUI (Graphical User Interface) aided devices available for use with information input; however, they are not always easy to use. Under present circumstances, appropriate information input devices (such as pointing devices) have not been put into practical use which are provided with manipulation resolving power comparable to the resolution of display devices.

For example, a mouse, or a typical pointing device such as for use with PCs, requires a flat desktop surface of a certain area for manipulation and cannot be hand held for free manipulation. Furthermore, since the mouse requires the action of the wrist and the elbow and thus provides subtle control with difficulty, the mouse cannot be said to be an information input device with a high manipulation resolving power. On the other hand, a touch-panel type information input device is built in notebook PCs. In this arrangement, the panel itself is secured to the PC, thus lacking in manipulation flexibility. Additionally, the panel is intended to sense the position of such a big object as a finger, thus providing a significantly bad manipulation resolving power. The panel also causes the user to feel uncomfortable when the fingertip rubs against the panel.

To address these problems, various types of information input devices have been suggested which permit fingertip manipulations with greater flexibility.

Figure 1:
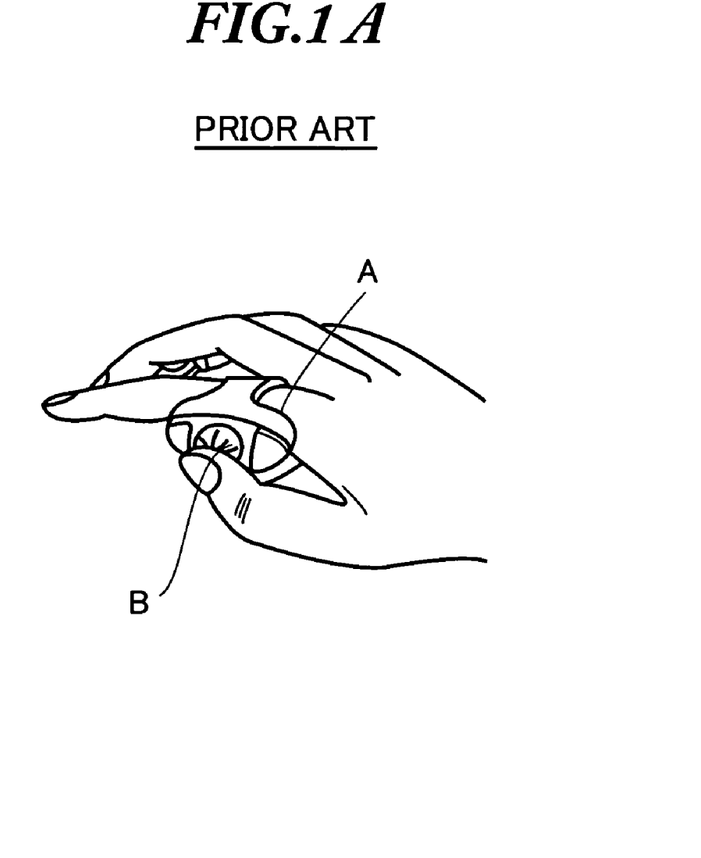
FIGS. 1A and 1B are schematic views showing conventional examples.

For example, Japanese Patent Publication No. Hei 7-117875 and Japanese Patent Application Laid-Open No. Hei 10-301706 disclose information input devices which permit fingertip manipulations of an input portion "B" (slider or stick) of a device body "A" that is hand held or mounted on a finger (see FIG. 1A). On the other hand, Japanese Patent Application Laid-Open No. Hei 10-207616 discloses an information input device which allows a finger to slide an input portion "B" (control portion) relative to a device body "A" (base) so that a sensor provided under the input portion "B" senses the displacement of the input portion (see FIG. 1B).

In general, the human finger is said to provide the highest manipulation resolving power. However, in the conventional techniques mentioned above, the device body is basically secured to part of a hand or the like and allows manipulation on the device with one finger. Thus, this arrangement is not sufficiently enough to take advantage of the subtle resolving power of the fingertip. Accordingly, although the portability of the devices provides greater manipulation flexibility, there arises a problem when the devices are employed, e.g., as a GUI pointing device. That is, high manipulation resolving power cannot be provided corresponding to a high-resolution or wide display screen, thus making it difficult to accurately locate the pointer on the screen. It is also difficult to input various types of information through manipulation on one input portion due to lack of corresponding manipulation resolving power. Thus, this raises another problem that the types of information to be entered have to be reduced.

SUMMARY OF THE INVENTION

The present invention was developed to address these problems. It is therefore an object of the present invention to provide an information input device and an information input method which provide portability to thereby improve manipulation flexibility and which have a high manipulation resolving power. It is another object of the invention to provide an information input device and an information input method which can be used for a GUI input device allowing accurate positioning of the pointer corresponding to a high-resolution or wide display screen. It is still another object of the invention to provide an information input device and an information input method which enable the entry of various types of information through simple manipulation on an input portion.

To achieve these objects, an information input device and an information input method according to the present invention include at least the aspects set forth in the respective independent claims below.

According to a first aspect of the present invention, an information input device comprises: two relatively slidable plate-shaped input members held between fingertips or parts of fingers of a hand to slide relative to each other; and an information producing portion for producing input information in accordance with at least a relative position or a relative movement of the plate-shaped input members.

According to a second aspect of the present invention, an information input method comprises the steps of: holding two relatively slidable plate-shaped input members between fingertips or parts of fingers of a hand to slide the two plate-shaped input members relative to each other; and thereby producing input information in accordance with a relative position or a relative movement of the plate-shaped input members.

BRIEF DESCRIPTION OF THE DRAWINGS

These and other objects and advantages of the present invention will become clear from the following description with reference to the accompanying drawings, wherein.

DETAILED DESCRIPTION OF THE PREFERRED EMBODIMENTS

Figure 2:
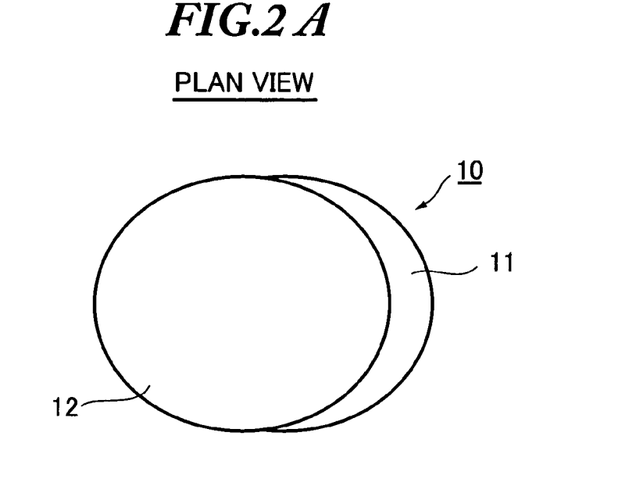
FIGS. 2A through 2C are views showing the basic configuration of a device according to the present invention and one of ways of using the device.

Now, the present invention will be described below in more detail with reference to the accompanying drawings in accordance with the embodiments. FIGS. 2A through 2C are explanatory views showing an information input device and an information input method according to an embodiment of the present invention, in which FIG. 2A is a plan view, 2B is a cross-sectional view, and 2C is an explanatory view showing how the device is manipulated.

The information input device and method according to an embodiment of the present invention take advantage of the fact that the human's fingertip provides the highest resolving power action among any other parts of the human being, and attention can be most readily concentrated on the fingertip or part of a finger especially upon holding an object therebetween, thereby facilitating movement of the object as desired. In other words, use is made of the movement of holding and sliding objects between the tips or parts of two fingers of a hand (e.g., between the fingertip of the thumb and the top portion of the index finger including the second joint) for an input operation of the information input device.

FIGS. 2A and 2B show the basic configuration of an information input device according to an embodiment of the present invention. The information input device 10 includes two plate-shaped input members 11 and 12 which can be held between fingertips or pats of fingers of a hand to slide relative to each other. Also included is an information producing portion (not shown) for producing input information in accordance with the relative position or relative movement of the plate-shaped input members 11 and 12.

For example, as shown in FIG. 2B, the two plate-shaped input members 11 and 12 are retained inseparably from each other. Preferably, a high-viscosity solution such as grease applied between the plate-shaped input members 11 and 12 may provide smooth sliding movements as well as a certain sense of resistance. In the shown example, one member or the plate-shaped input member 11 has a bag-shaped space, which accommodates part of the other member or the plate-shaped input member 12. However, the present invention is not limited to this arrangement. The device may also include restricting means for limiting the direction of movement of the two plate-shaped input members 11 and 12.

More specifically, the two plate-shaped input members 11 and 12 include opposing slidable contact faces 11*a* and 12*a* and have contact faces 11*b* and 12*b* on the back thereof for the fingertip or part of a finger to contact with, respectively. One contact face of the plate-shaped input members 11 and 12 or the contact face 12*b* can contact with the surface of a thumb (see FIG. 2C). The contact face 11*b* can be provided, as required, with a recessed and projected portion "h" for producing a snug fit on the finger. In the case of FIG. 2C, the recessed and projected portion "h" retains the index finger in position. This arrangement is thus preferred also because a sensor attached to the plate-shaped input member 11 can easily identify the direction of movement of the plate-shaped input member 12, i.e., the direction of movement of the thumb relative to the index finger.

Now, reference is made to FIG. 2C to explain the use of the information input device 10. The thumb and another finger (e.g., index finger) located under the thumb hold the two plate-shaped input members 11 and 12 therebetween for sliding movement. Then, the information producing portion (not shown) produces input information in accordance with the relative position or the relative movement of the two plate-shaped input members 11 and 12.

Among other things, the information input device and method according to such an embodiment are adapted such that the device is mountable on a hand and thus provides high manipulation flexibility, thereby allowing the operator to take various postures for input operation. Additionally, the input operation is performed such that the two plate-shaped input members 11 and 12 are held and slid between fingertips or pats of fingers. This allows for performing the input operation by taking advantage of the human's movement of the highest resolving power as well as the movement that best reflects the operator's intention. It is thus possible to enter information with high manipulation flexibility and resolving power.

Reference is now made more specifically to the information producing portion mentioned above.

To begin with, the information producing portion includes displacement sensing means (sensor) for sensing the relative positional displacement between the plate-shaped input members 11 and 12. To provide a high pointing (positional information input) capability as a GUI input device, the information input device 10 according to an embodiment of the present invention can desirably permit positional information input with a degree of accuracy comparable to the resolution of currently available display devices (about a thousand dots). In this context, the information input device 10 according to an embodiment of the present invention takes advantage of relative positional displacement between fingers, the range of which is not wide (desirably should not be wide in terms of operability). Accordingly, the resolution of the relative positional displacement between the plate-shaped input members 11 and 12 is considered to be 10 μm or less.

Now, as an exemplary method of sensing the relative positional displacement between such two minute plates, FIGS. 3A through 3D show an implementation of relative positional displacement detection using moiré fringes. As well known to those skilled in the art, moiré fringes consist of a series of light and dark patterns generally caused by a superposition of fine meshes such as of silk fabrics. This phenomenon would allow a fine positional displacement to appear as a much greater change in scale of the light and dark pattern, and is thus useful for the present invention which needs to sense an infinitesimal positional displacement.

The relative positional displacement sensor according to this implementation includes two film-like sheets with light-transmitting and light-blocking portions that are alternately arranged in a pattern of vertical stripes. The sheets are placed on the respective slidable faces 11*a* and 12*a* of the upper and lower plate-shaped input members, the positional displacement of which is to be detected. There are also placed a light-emitting device (LED) and a photo-detector (PD) across these sheets in the respective upper and lower plate-shaped input members 11 and 12 (see FIGS. 8 and 3D in which the light-transmitting portion is illustrated in white and the light-blocking portion in black.) In each sheet, the stripe-shaped light-transmitting and light-blocking portions are assumed to have the same width, with the upper sheet stripe (upper stripe) having a width of $d_u$ and the lower sheet stripe (lower stripe) having a width of $d_l$.

Figure 3:
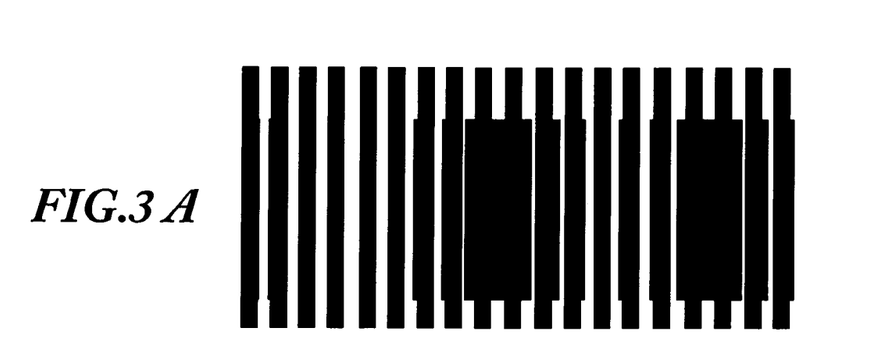
FIGS. 3A through 3D are views showing a method for sensing the relative positional displacement of two plates using moiré fringes.

Now, an explanation is given to the operation of the sensor. FIGS. 3A to 3C are views of the two superimposed sheets of vertical stripes when viewed from above, in which the upper and lower sheets have slightly different stripe widths. In the figures, for ease of understanding, the vertical width of the lower sheet is smaller than that of the upper one. However, these figures are intended to visually show the moiré effect and have no positional correspondence with FIG. 3D. Suppose that the upper sheet displaces toward the left by the stripe width from the position of FIG. 3A which provides the same relative movement as the lower sheet would when moving toward the right. In this case, the moiré fringes being overlapped one another change as shown in FIGS. 3B and 3C. During this displacement, the leftmost photo-detector (PD) changes from the light-transmitting state (A) through the semi-transmitting state (B) to the light-blocking state (C). That is, the photo-detector PD gradually reduces its output current from maximum in the ON state to zero in the OFF state. A further movement of the sheet toward the left by the stripe width causes the output current to change from the OFF state to the ON state.

Accordingly, the counts "n" of changes in current (ON to OFF, and OFF to ON) allow the displaced distance to be calculated according to the stripe width of the sheet times the counts "n" of changes in current. For example, letting the stripe width be 10 μm, the amount of positional displacement can be detected in units of (or with an accuracy of) 10 μm.

In conjunction with the amount of positional displacement, the direction of a sideward movement may also be detected. To this end, as shown in FIG. 3D, three sets of light-emitting devices (LED) and photo-detectors (PD) are placed. By comparison of the (ON/OFF) state of the middle PD with the ON/OFF state of the right and left PDs before changed, the direction of the sideward movement is detected depending on which one of the right and left PDs has been maintained in the same state. With the upper and lower stripe widths being $d_u$ and $d_l$, respectively, the spacing L between the moiré fringes is inversely proportional to the difference between the stripe widths as expressed by $L = d_u \cdot d_l / |d_u - d_l|$. The aforementioned three photo-detectors and light-emitting devices are placed at intervals of halves of the spacing, i.e., L/2.

As described above, the sideward movement is thus detected in one direction (X axis). Likewise, it is also possible to detect a movement in a direction orthogonal thereto (Y axis) using the aforementioned three sets of photo-detectors and light-emitting devices placed in the Y-axis direction.

In the foregoing, a method of sensing a relative positional displacement using moiré fringes has been explained; however, the invention is not limited to the aforementioned method but may also employ other methods so long as they can serve to sense relative positional displacements. For example, a resistive thin-film sensor or a Magnescale, which has enough resolving power and can be realized in the form of a thin sheet, may also be used as the aforementioned relative positional displacement sensing means.

Figure 4A:
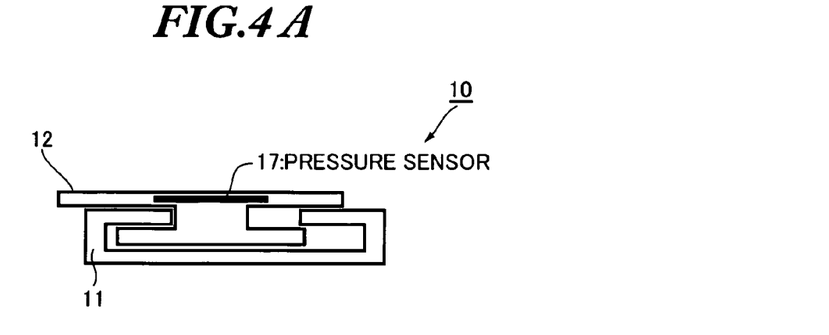
FIGS. 4A through 4C are views showing a device including a three-state pressure sensor and explaining a method for identifying a non-manipulated state, slid state, and clicked state using the three-state pressure sensor.

Reference is now made to FIGS. 4A to 4C, and FIG. 8 to describe an implementation which has pressure sensing means (sensor) as the information producing portion. FIG. 4A shows an implementation of pressure sensing means (sensor) 17 in which one pressure sensor 17 is placed on the upper plate-shaped input member 12. However, for example, it is also possible to place the pressure sensor 17 on the lower plate-shaped input member 11 or employ a plurality of pressure sensors 17. Furthermore, a spring structure may also be provided to obtain a click feeling.

For one thing, the pressure sensor 17 can serve to provide a function corresponding to a so-called mouse-click (an input instruction function at the corresponding cursor position). This operation can be realized by applying a higher finger pressure in a short time than during the sliding operation.

Figure 4B:
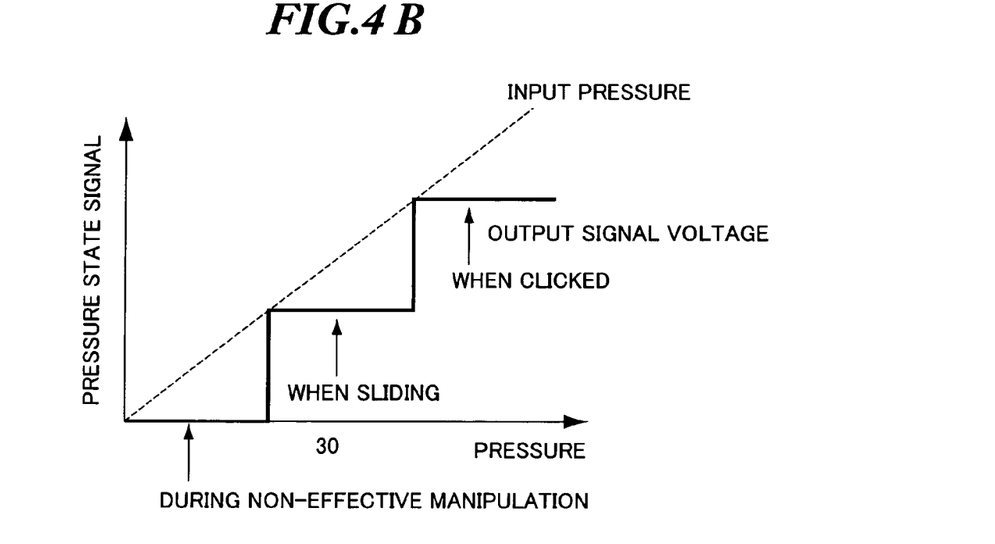

For example, suppose that a piezoelectric sensor is employed as shown in FIG. 4B. In this case, the pressure sensor 17 also has a function for detecting analog voltage signals, corresponding to the pressure applied by a finger, separately in three pressure states, i.e., non-effective manipulated state, sliding state, and clicked state.

In addition to the click function, this is intended to provide a capability of sending a signal from the aforementioned relative position sensing means to an external circuit only during manipulation (sliding). To this end, this additional function has been provided for distinguishing between the pressure exerted by a finger being placed on the plate-shaped input member 12 for sliding it and the pressure in the non-effective manipulated state. Thus, at the pressure in the non-effective manipulated state, this additional function serves to stop the signal from the aforementioned relative position sensing means.

Figure 4C:
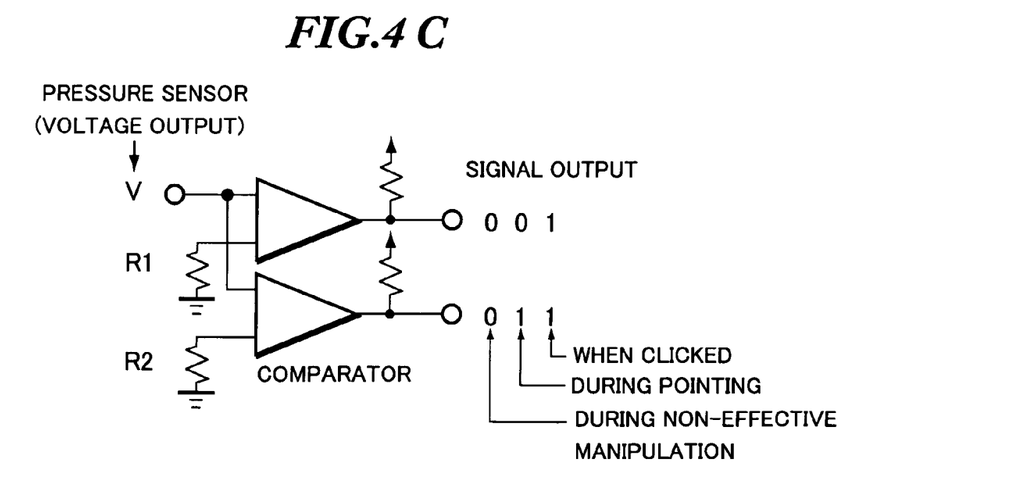

Shown in FIG. 4C is an exemplary circuit for this purpose. The circuit includes resistors R1 and R2 and two comparators. The resistors R1 and R2 can be adjusted to optimally distinguish between the pressures in the non-effective manipulated and sliding states and between the pressures in the sliding and clicked states. The three states are finally identified in combination of ON and OFF of two outputs. The circuit can be thus used to control the transmission of the aforementioned click signal and the relative positional displacement sensing signal. For example, the output voltage of the pressure sensor can also be converted from analog to digital to digitally identify the three pressure states without using such a circuit.

The aforementioned relative positional displacement sensing means and pressure sensing means can provide the position information input function and the click function as provided by the mouse. Additionally, a tilt sensor to be discussed below can be employed to provide the right and left click identification function as provided by the mouse.

Figure 5:
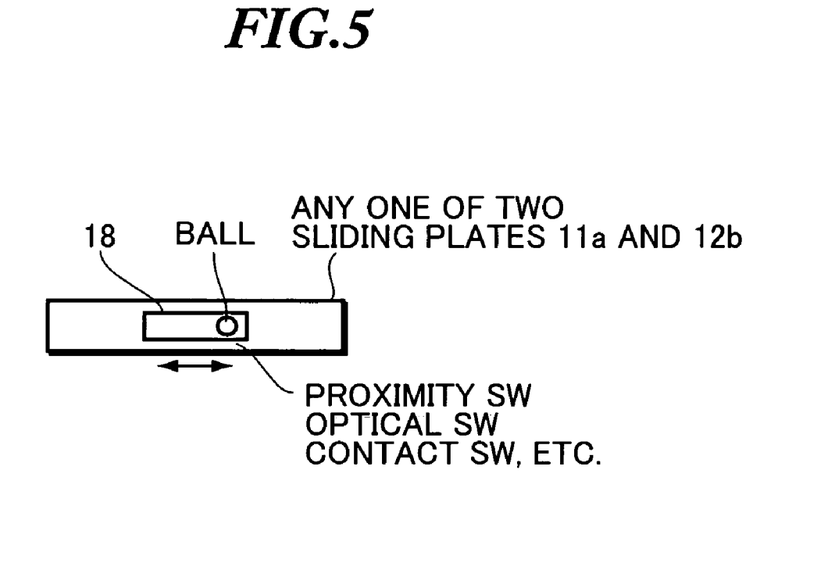
FIG. 5 is a view showing an example including a tilt sensor for sensing the tilt of a plate toward a particular direction, e.g., in which a click action provided in response to a right or left tilt is distinguished between the right and left clicks.
Figure 8:
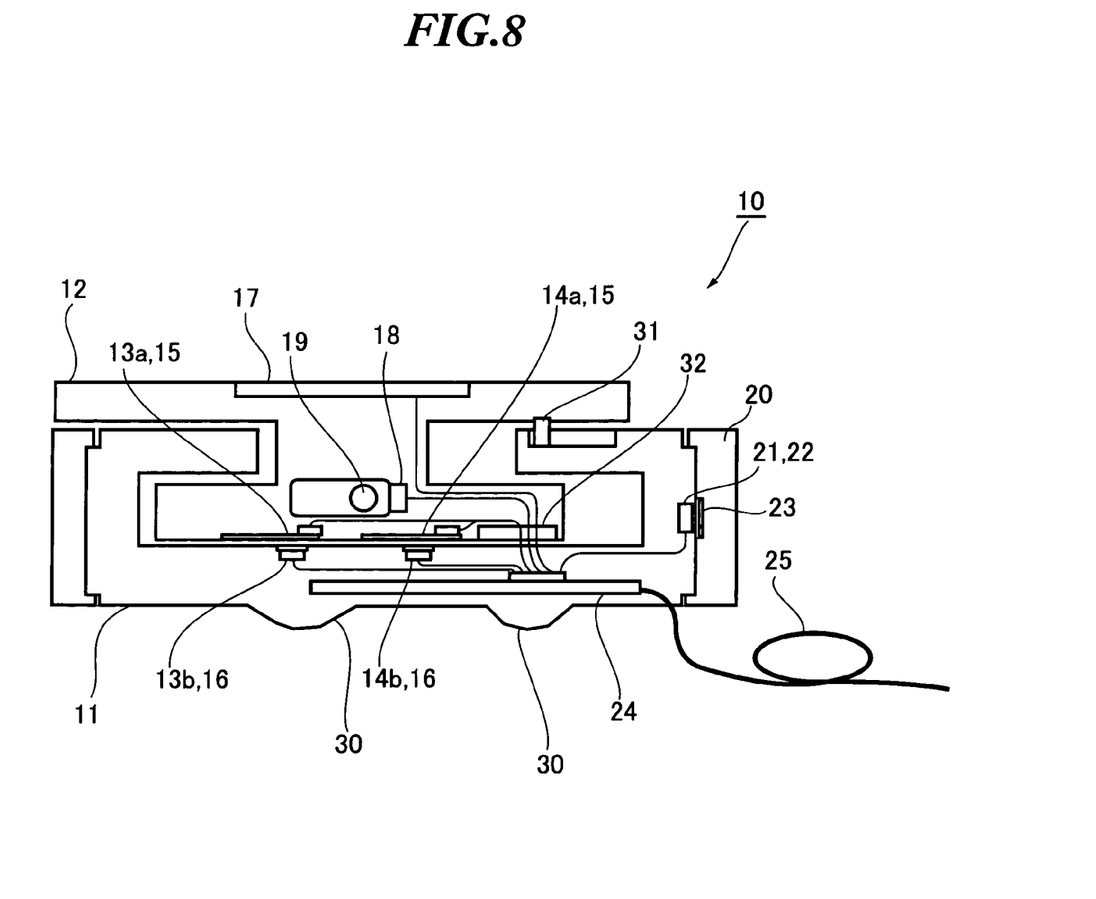
FIG. 8 is a view showing an example of an information input device of the present invention which incorporates various types of sensors.

FIGS. 5 and 8 are views showing an implementation which includes tilt sensing means (sensor) 18 for sensing the tilt of the plate in a particular direction. In this example, the tilt sensor 18 is a proximity switch; however, the invention is not limited thereto but may also employ an optical switch, a contact switch or the like. For example, this sensor can be adapted to sense a right or left tilt when it is held by a hand. This allows a signal indicative of a tilt and a click signal provided when the pressure is sensed by the aforementioned pressure sensor to be combined with each other for input corresponding to the so-called right or left click as provided by a two-button mouse.

For example, it is also possible to place two pressure sensors separately on the right and left of the plate-shaped input member 12, so that the difference in finger pressure between the right and left sensors can be detected to thereby sense the right or left click. Alternatively, such an embodiment is also possible which employs a large-area pressure sensor having a plurality of pressure sensors or a plurality of divided sensing portions and allows the pressure state to be continuously detected, thereby controlling two-dimensional cursor movements by selecting and applying a depressing pressure to the sensing portions.

Figure 6:
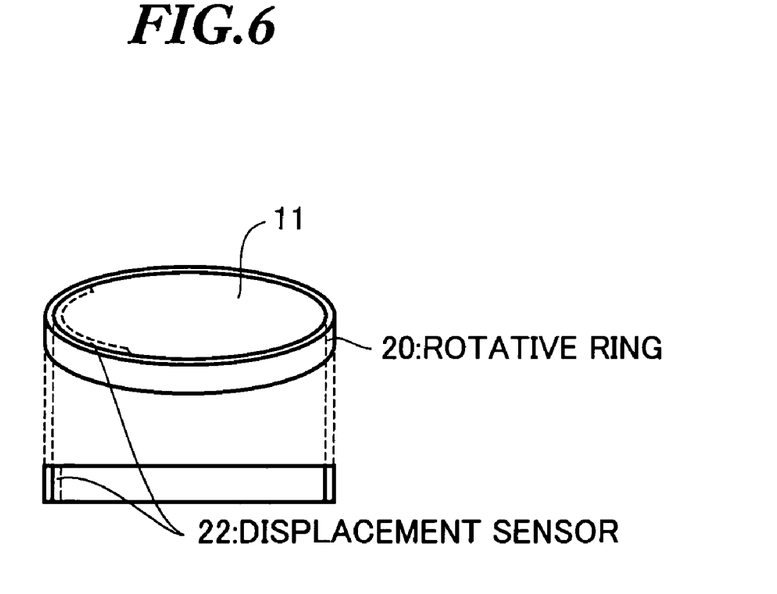
FIG. 6 is a view showing an example which includes a linear rotative ring and a displacement sensor as information input means.

Now, as one of implementations which include a linearly movable member, FIG. 6 shows an example which includes a rotative ring 20 that is rotatable around the plate-shaped input member 11. The rotative ring 20 is adapted to rotate around the plate-shaped input member 11. A linear displacement sensor 22 is placed between the rotative ring 20 and the plate-shaped input member 11 to sense the relative positional displacement therebetween. This arrangement allows for detecting a rotational displacement of the rotative ring 20 to output a signal corresponding to the rotational displacement. That is, the rotative ring 20 can be adjusted in position thereby causing a signal corresponding to the adjustment to be sent to an external circuit. Accordingly, for example, the rotative ring 20 can serve as a volume controller for the corresponding apparatus or as a mouse center roller.

FIG. 8 shows an example of a sensor which employs, as the linear displacement sensor 22, the same moiré fringes as used for sensing the relative positional displacement of the aforementioned plate-shaped input members. In this example which employs a reflective optical slit sensor, a light beam from a light source LED 21 on the plate-shaped input member 11 passes through a light-transmitting stripe pattern and a reflective optical slit 23 to impinge upon a stripe pattern attached to the rotative ring 20. The light beam reflected therefrom is received on the sensor PD 22 also provided on the plate-shaped input member 11 for sensing the relative positional displacement. It is also possible to utilize as appropriate other sensors such as a transmissive optical slit sensor, magnetic scale sensor, or resistive sheet type displacement sensor.

Now, an explanation is given to a toggle switch function. This function serves to provide a sudden change to the aforementioned various types of sensors, thereby allowing for detecting a state being different from the normal input states, e.g., to switch between modes. For example, this function can be utilized to switch between the operation modes of the aforementioned linear displacement sensor without an additional switch or the like.

For example, this toggle switch function can be provided to the relative positional displacement sensing means that uses moiré fringes. This is realized by sensing the plate being quickly moved, i.e., a particularly larger number of pulses being counted in a short period of time.

To realize this using the pressure sensor 17, a click action longer than usual ones is detected or alternatively the sliding and non-manipulation actions being repeated (i.e., the sliding pressure and no-pressure being repeated) in a short time is detected.

The tilt sensor 18 may also be used for this purpose. In this case, ON, OFF, and ON signals are detected which are provided by tilting the sensor 18, e.g., toward right, left, and right in a short time or alternatively by shaking the hand.

Figure 7:
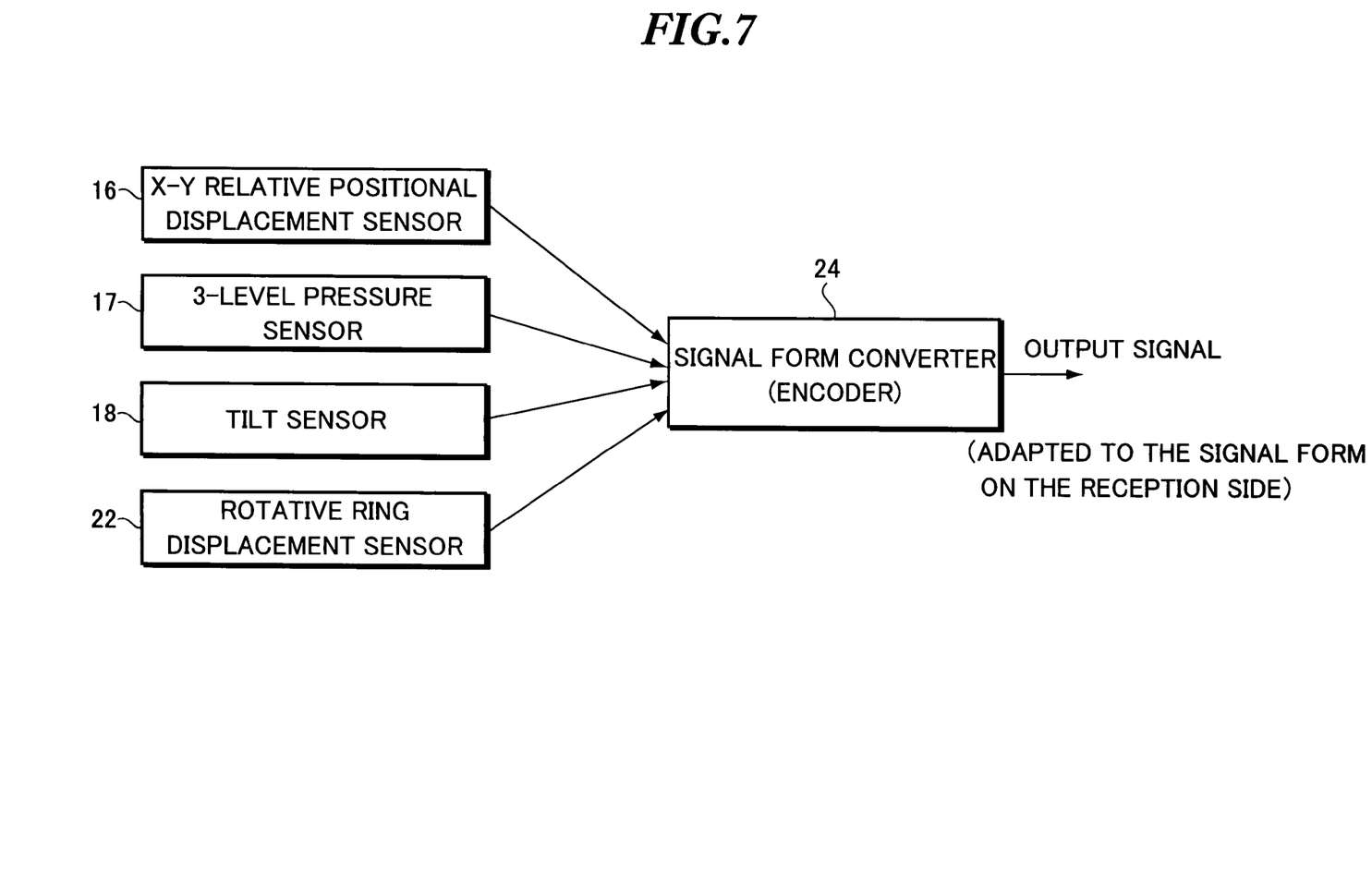
FIG. 7 is a block diagram showing how sense signals from various sensors are integrated and converted to a suitable signal form.

FIG. 7 is a block diagram showing how the sense signals from the aforementioned various sensors are integrated at a signal form converter (encoder IC) 24 and converted to an output signal, suitable for a signal form (e.g., a USB signal) for apparatus to which information is to be entered, for transmission to an external circuit.

FIG. 8 shows an integrated implementation which includes collectively all the aforementioned functions. Most of the functions have already been described. This implementation further includes mechanisms such as a contact recessed and projected structure 30 for facilitating finger contact, a rotation restricting recess and projection 31 for restricting the rotational movement of the plate-shaped input member 12, and connection-wire accommodating grooves 32 for maintaining the flexibility of connection wires for transmitting signals and supplying power between the sliding plate-shaped input members. Explaining the respective locations of various kind of sensors, provided at the side of the plate-shaped input member 11 are the recessed and projected structure 30 for facilitating finger contact on a depth thereof, and further a pattern 13b in the X-axis direction, a pattern 14b in the Y-axis direction, and photo-detector(PD) 16 for sensing the relative positional displacement, respectively. In addition, provided thereon are the light source LED 21 constituting the displacement sensor 22 and the signal form converter 24 to which the output line or the power wire is connected. Furthermore, the rotative ring 20 of the displacement sensor 22 is located around the plate-shaped input member 11. Moreover, provided at the side of plate-shaped input member 12 are a pattern 13a in the X-axis direction, a pattern 14a in the Y-axis direction, and light-emitting device(LED) 15 for sensing the relative positional displacement, respectively, and further the pressure sensor 17 and the tilt sensor 18 (sphere 19).

Figure 9:
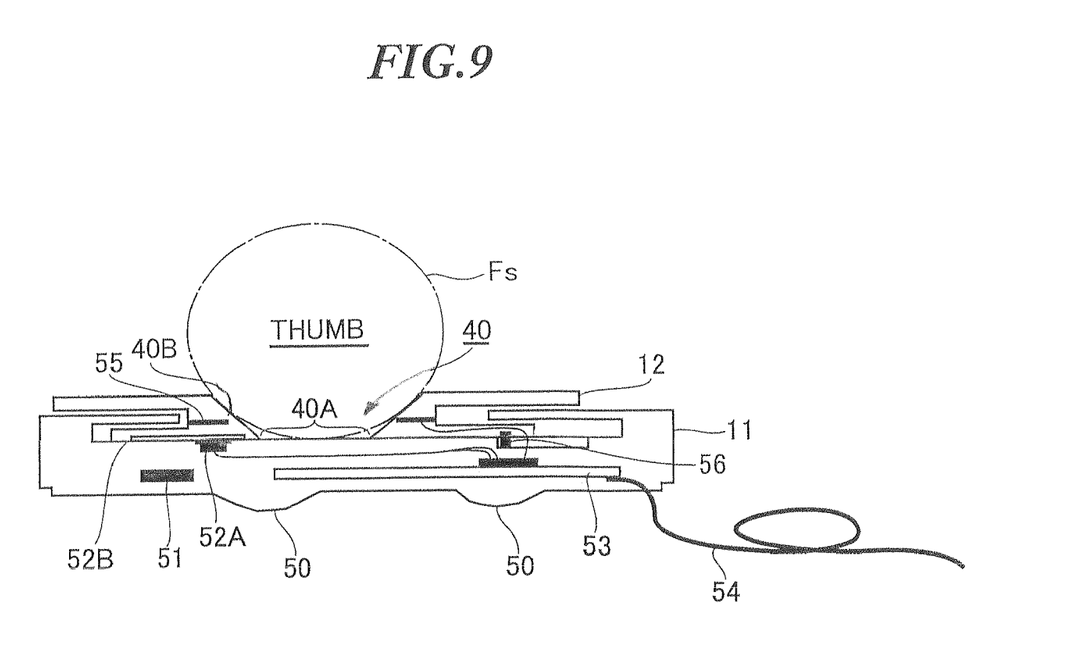
FIG. 9 is an explanatory view showing the other embodiment of the present invention.
Figure 10:
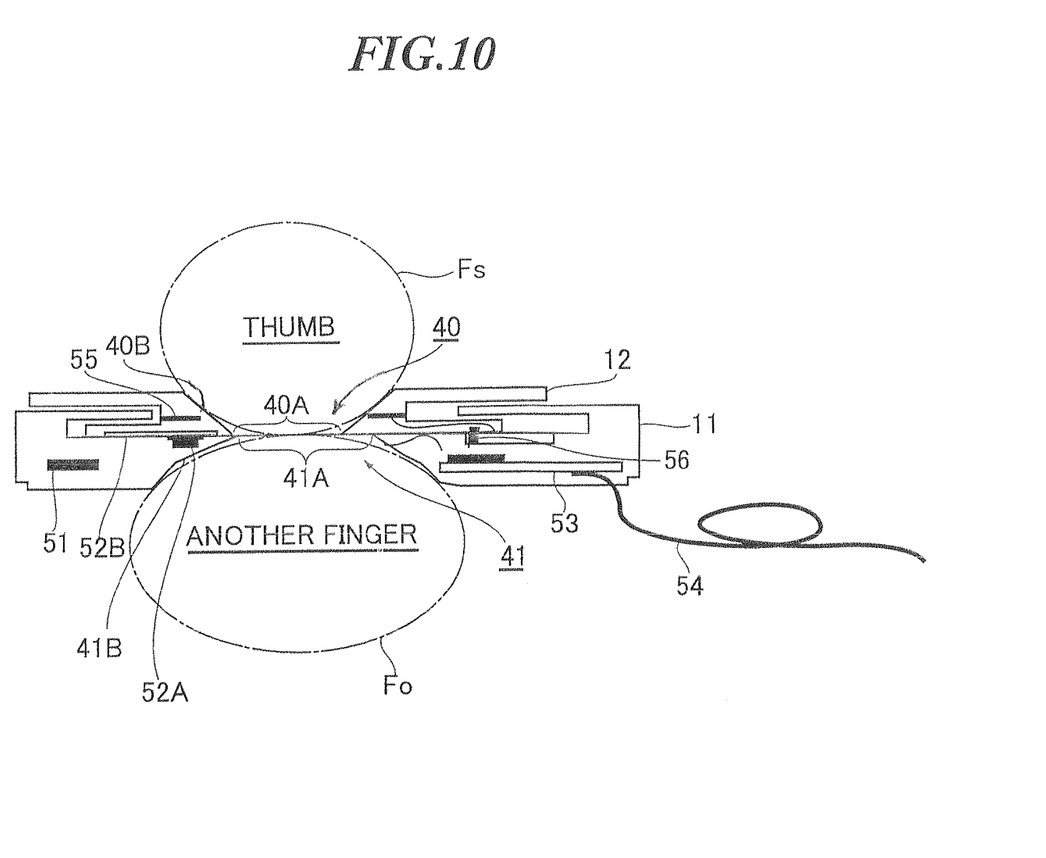
FIG. 10 is an explanatory view showing the still other embodiment of the present invention.

FIGS. 9 and 10 are explanatory views showing the other embodiments of the present invention. The input device of these embodiments has a configuration, in which the relative positional displacement of the plate-shaped input members 11, 12 can be directly sensed by the fingers with which the plate-shaped input members are held.

In the embodiment as shown in FIG. 9, a hole 40 is formed on one of the two plate-shaped input members 11, 12. Although the hole 40 is formed at the side of upper plate-shaped input member 12 in FIG. 9, the hole 40 may be made at the lower plate-shaped input member 11. The hole 40 comprises an opening portion 40A through which the operator's fingertip or a part of his/her finger senses the relative positional displacement of one plate-shaped input member as a change in the fingers' sense as received from the other plate-shaped input member, and a side surface 40B with which the fingertip or the part of his/her finger contacts. The side surface 40B is formed with a tapered phase which is effective for fingers different in size.

According to this configuration, since a thumb Fs laid on, for example, the plate-shaped input member 12 directly contacts with the slidable contact face of the plate-shaped input member 11 through the opening portion 40A, the relative positional displacement caused between the plate-shaped input members 11, 12 can be directly sensed by a change of fingers' sense such as the sense of touch. Additionally, since the thumb Fs is in the situation of contacting with the side surface 40B of the hole 40, the movement of the thumb Fs can be directly coupled with the relative movement between the plate-shaped input members 11, 12. In short, the user can operate the relative movement caused between the plate-shaped input members 11, 12 according to the change of sense of fingers which are more highly sensitive than the other body parts. As a result, the operation feeling of the input device is improved, so that a minute input operation can be performed without stress.

In the other embodiment as shown in FIG. 10, holes 41 and 42 are provided on both the sides of the two plate-shaped input members 11, 12, respectively. Each hole 41, 42 has an opening portion 41A, 42A, through which the relative positional displacement of the two plate-shaped input members 11, 12 can be sensed by a change of both the fingers' sense under the conditions where the user's fingertips or the parts of his/her fingers holding the two plate-shaped input members 11, 12 contact with each other, and further a side surface 41B, 42B with which the user's fingertip or the part of his/her finger are supported.

According to this configuration also, since the thumb Fs and the other finger Fo contact with each other through the opening portions 41A, 42A, the relative positional displacement caused between the plate-shaped input members 11, 12 can be directly sensed by a change of both the fingers' sense such as the sense of touch. Additionally, since the thumb Fs and the other fingers Fo are in the situation of contacting with the side surface 41B, 42B of the hole 41, 42, the respective movement of the thumb Fs and fingers Fo can be directly coupled with the relative movement between the plate-shaped input members 11, 12. In short, the user can operate the relative movement caused between the plate-shaped input members 11, 12 according to the change of sense of fingers which are more highly sensitive than the other body parts. As a result, the operation feeling of the input device is more improved, so that a minute input operation can be performed without stress. In particular, since the change of the respective senses in a plurality of fingers is adopted, the user is allowed to conduct the minute input with higher sensitivity and without stress.

Moreover, the term "change of fingers' sense" is defined as follows. That is, it includes, of course, the change of sense which is caused by any vibration or pressure change applied upon the finger when the finger is displaced or sliding against the plate-shaped input members 11 or 12 (the case of FIG. 9) or against the other finger (the case of FIG. 10). In addition to that, however, a minute or subtle change of sense also as caused by a subtle deformation of finger in the situation where they have not yet been displaced or sliding against each other is included in the term. Moreover, the opening portions 40A, 41A, 42A of the holes 40, 41, 42 are required to have enough wideness to feel the change of the finger's sense with the fingertip or the part of finger.

In the embodiments of FIGS. 9 and 10 also, a various kind of sensors can be mounted on the input device as well as the embodiment of FIG. 8. In FIG. 9, the recessed and projected structure 50 for retaining the finger is formed on a back side of the plate-shaped input member 11 or 12 without the hole 40. For example, provided at the side of the plate-shaped input member 11 are a tilt sensor 51 comprising a semiconductor sensor, a light-emitting device (LED) and reflector type patterns in the X-direction and the Y-direction, a part of displacement sensor 52A comprising photo-detector, a signal form converter 53, and output signal lines and power wire 54 connected thereto. Further, provide at the side of the plate-shaped input member 12 are a reflection portion 52B of the displacement sensor, and a pressure sensor 55 comprising a pressure sensitive resistance sheet or the like. Additionally, provided thereon is a rotation restricting recess and projection 56 for restricting the rotational movement of the plate-shaped input members 11, 12, which serves as a connection-wire accommodating grooves also for maintaining the flexibility of connection wires for transmitting signals and supplying power between the sliding plate-shaped input members.

The information input device according to the present invention can employ any types of information producing portions without being limited to the aforementioned examples. Irrespective of such forms of the information producing portions, the embodiments of the present invention feature the two relatively slidable plate-shaped input members 11 and 12 held between fingertips or parts of fingers of a hand to slide relative to each other, and input information being produced in accordance with at least a relative position or a relative movement of the plate-shaped input members 11 and 12. This allows the embodiments of the present invention to provide an information input device which provides portability to thereby improve manipulation flexibility. The device also allows accurate positioning of the pointer using subtle sense and superb resolving power of human fingers. The device further makes it possible to enter various types of information through simple manipulation on the input portion.

While there has been described what are at present considered to be preferred embodiments of the present invention, it will be understood that various modifications may be made thereto, and it is intended that the appended claims cover all such modifications as fall within the true spirit and scope of the invention.

What is claimed is:

1. An information input device comprising:
   two relatively slidable plate-shaped input members held between fingertips or parts of fingers of a hand to slide relative to each other; and
   an information producing portion for producing input information in accordance with at least a relative position or a relative movement of the plate-shaped input members, wherein
   one of the two relatively slidable plate-shaped input members is provided with an opening portion surrounded by at least one side surface; and
   the opening portion of the one plate-shaped input member is configured to allow an operator's fingertip or a part of his/her finger to directly contact with a slidable contact face of the another plate-shaped input member through the opening portion so as to sense a relative positional displacement of the two plate-shaped input members as a change in the fingers' sense, and the opening portion is further configured to allow the operator's fingertip or a part of his/her finger to contact with the at least one side surface.

2. The information input device according to claim 1, wherein
   the two plate-shaped input members are retained inseparably from each other.

3. The information input device according to claim 1, wherein
   the two plate-shaped input members comprise opposing slidable contact faces and each have a contact face on a back thereof for the fingertip or part of a finger to contact with; and
   one of the contact faces on the plate-shaped input members can contact with the surface of a thumb.

4. The information input device according to claim 3, wherein
   at least one of the contact faces on the two plate-shaped input members is provided with a recessed and projected portion for defining an orientation of retaining a fingertip.

5. The information input device according to claim 1, wherein
   the information producing portion produces input information in accordance with a relative movement of the two plate-shaped input members in a particular planar direction.

6. The information input device according to claim 1, wherein
   the information producing portion comprises a pressure sensor for sensing a depressing pressure applied to the plate-shaped input members, and produces input information in accordance with an output from the pressure sensor.

7. The information input device according to claim 6, wherein
   the pressure sensor produces input information associated with a position or a magnitude of pressure applied to the plate-shaped input members.

8. The information input device according to claim 1, wherein
the information producing portion comprises a tilt sensor for sensing a tilt of the plate-shaped input members and produces input information in accordance with an output from the tilt sensor.

9. The information input device according to claim 1, wherein
the information producing portion comprises a rotative ring for rotating around the plate-shaped input members and sensor for sensing a relative rotation of the rotative ring with respect to the plate-shaped input members; and
the information producing portion produces input information in accordance with an output from the sensor.

10. The information input device according to claim 1, wherein
the information producing portion has a toggle switch function.

11. An information input device comprising:
two relatively slidable plate-shaped input members held between fingertips or parts of fingers of a hand to slide relative to each other; and
an information producing portion for producing input information in accordance with at least a relative position or a relative movement of the plate-shaped input members, wherein
both the two relatively slidable plate-shaped input members are provided with an opening portion surrounded by at least one side surface, respectively; and
the opening portions of the two plate-shaped input members are configured to allow an operator's fingertip or a part of the fingertip to contact with the operator's another fingertip of a part of the another fingertip through the opening portions of the two plate-shaped input members so as to sense a relative positional displacement of the two relatively slidable plate-shaped input members as a change in the fingers' sense, and the opening portions also allow the operator's fingertip or a part of the fingertip and the another fingertips or a part of the another fingertip to contact with the side surfaces, respectively.

12. The information input device according to claim 11, wherein
the two plate-shaped input members are retained inseparably from each other.

13. The information input device according to claim 11, wherein
the two plate-shaped input members comprise opposing slidable contact faces and each have a contact face on a back thereof for the fingertip or part of a finger to contact with; and
one of the contact faces on the plate-shaped input members can contact with the surface of a thumb.

14. The information input device according to claim 13, wherein
at least one of the contact faces on the two plate-shaped input members is provided with a recessed and projected portion for defining an orientation of retaining a fingertip.

15. The information input device according to claim 11, wherein
the information producing portion produces input information in accordance with a relative movement of the two plate-shaped input members in a particular planar direction.

16. The information input device according to claim 11, wherein
the information producing portion comprises a pressure sensor for sensing a depressing pressure applied to the plate-shaped input members, and produces input information in accordance with an output from the pressure sensor.

17. The information input device according to claim 16, wherein
the pressure sensor produces input information associated with a position or a magnitude of pressure applied to the plate-shaped input members.

18. The information input device according to claim 11, wherein
the information producing portion comprises a tilt sensor for sensing a tilt of the plate-shaped input members and produces input information in accordance with an output from the tilt sensor.

19. The information input device according to claim 11, wherein
the information producing portion comprises a rotative ring for rotating around the plate-shaped input members and sensor for sensing a relative rotation of the rotative ring with respect to the plate-shaped input members; and
the information producing portion produces input information in accordance with an output from the sensor.

20. The information input device according to claim 11, wherein
the information producing portion has a toggle switch function.

* * * * *